Figure 1:
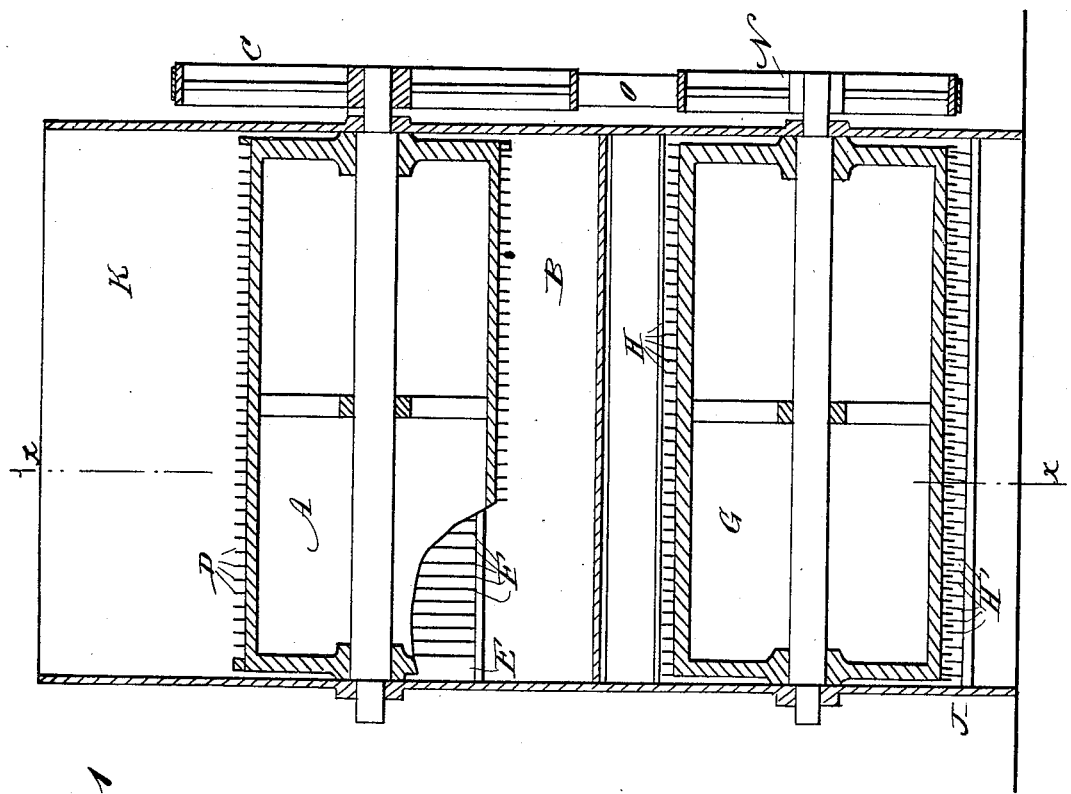

(No Model.)

2 Sheets—Sheet 1.

G. C. MUELLER.
CORN CRUSHER.

No. 266,873.

Patented Oct. 31, 1882.

WITNESSES:
C. Neveux
C. Sedgwick

INVENTOR:
G. C. Mueller
BY Munn & Co
ATTORNEYS.

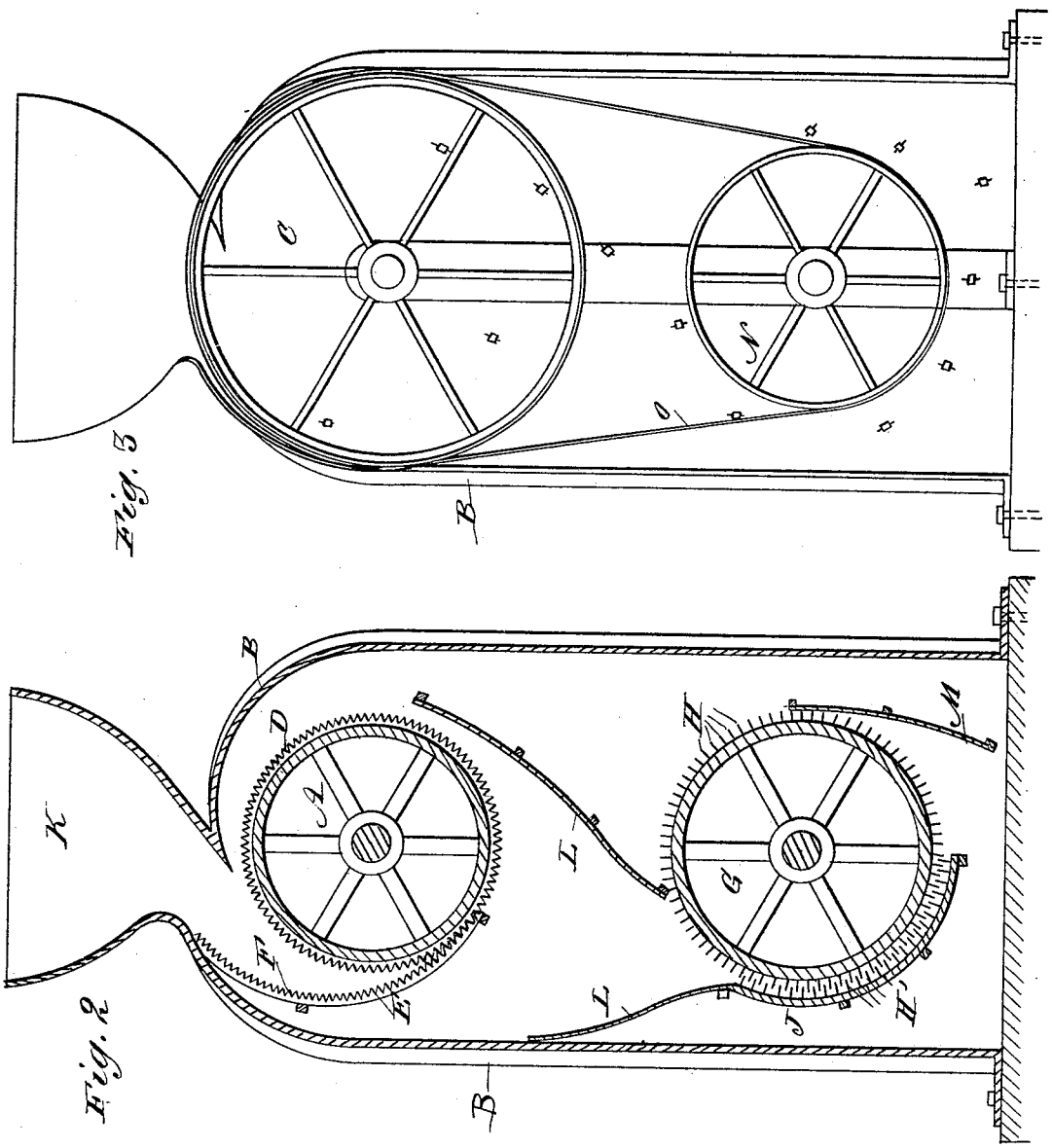

UNITED STATES PATENT OFFICE.

GEO. C. MUELLER, OF SAN FRANCISCO, CALIFORNIA.

CORN-CRUSHER.

SPECIFICATION forming part of Letters Patent No. 266,873, dated October 31, 1882.

Application filed June 19, 1882. (No model.)

*To all whom it may concern:*

Be it known that I, GEORGE C. MUELLER, of San Francisco, in the county of San Francisco and State of California, have invented a new and Improved Corn-Crusher, of which the following is a full, clear, and exact description.

The object of my invention is to provide a new and improved machine for crushing corn-ears into meal which can be used for fodder.

The invention consists in a casing containing a cylinder on which saw-blades are secured, between which cylinder and a curved frame, also provided with saw-blades, the ears of corn pass and are cut to pieces, and these pieces are then guided by suitable guide-plates to a cylinder provided with studs on its surface, between which cylinder and a curved frame, also provided with studs, the pieces of the ears of corn are crushed to meal which is to be used for fodder, as hereinafter fully described, and pointed out in the claims.

Reference is to be had to the accompanying drawings, forming part of this specification, in which similar letters of reference indicate corresponding parts in all the figures.

Figure 1 is a longitudinal sectional elevation of my improved corn-crusher, parts being shown broken out. Fig. 2 is a cross-sectional elevation of the same on line *x x*, Fig. 1. Fig. 3 is an end elevation of the same.

A cylinder, A, is journaled, in a horizontal position, in a box or casing, B, and on the outer end of the pivot of this cylinder a belt-pulley, C, is rigidly mounted. A series of saws, D, having teeth in the shape of isosceles triangles, are secured transversely and parallel to each other, and suitably spaced on this cylinder, so that they project from the cylindrical surface of the cylinder, which saws are secured on the cylinder in any suitable manner. A curved frame, E, is fastened to the side of box or casing B, and projects down under and toward the cylinder A, on which frame a series of saws, F, are secured in such a manner that they pass in between the saws D. A cylinder, G, is journaled in the casing B, below and parallel with the cylinder A, on which cylinder G a series of pegs or pins, H, are fastened, which project from this cylinder. A curved frame, J, having a segment-shaped cross-section, is secured to the casing, and is held a short distance from the surface of this cylinder, from which frame J a series of pegs or pins, H', project, which pass in between the rows of pegs H on the cylinder G. A hopper, K, extends longitudinally along the top of the casing B, from which hopper the ears of corn drop upon the cylinder A. Two curved guide-plates, L, are arranged below the cylinder A, and a like plate, M, is arranged below the cylinder G. These plates L and M prevent the pieces of the ears of corn from being thrown about in the casing, and from being carried around by the cylinders. A pulley, N, is mounted on one end of the shaft of the cylinder G, and a belt, O, is passed around the pulleys C and N. The pulley C can be rotated by hand-power or any other power.

The ears of corn drop from the hopper K upon the cylinder A and upon the curved frame E, and pass down the tapering space between the cylinder A and this frame E, and are cut into small pieces by the saws D and F. These pieces drop upon the plates L and upon the cylinder G, and are crushed between the cylinder and the curved plate or frame J and converted into meal, which passes into a suitable vessel or receptacle placed under the casing or box B, which must be placed a suitable distance above the ground to permit placing this vessel or receptacle under it. The corn-meal thus obtained from the ears which are not husked nor shelled is to be used for fodder.

Having thus fully described my invention, I claim as new and desire to secure by Letters Patent—

1. In a corn-crusher, the combination, with the casing B, the cylinder A, provided with the series of parallel saws D, and the frame E, provided with the saws F, working between the saws D, of the cylinder G, provided with a series of parallel rows of pins, H, and the frame J, provided with the pins H', working between the rows of pins H of the cylinder G, substantially as and for the purpose set forth.

2. In a corn-crusher, the combination, with the casing B, of the cylinder A, provided with saws D, the frame E, provided with saws F, the cylinder G, provided with studs H, the frame J, provided with studs H', and the guide plates or frames L, substantially as herein shown and described, and for the purposes set forth.

3. In a corn-crusher, the combination, with the casing B, of the cylinder A, provided with saws D, the frame E, provided with saws F, the cylinder G, provided with studs H, the frame J, provided with studs H', and the guide plates or frames L and M, substantially as herein shown and described, and for the purposes set forth.

GEO. C. MUELLER.

Witnesses:
WILLIAM F. LUNING,
CORNELIUS S. BURGESS.